(12) United States Patent
Schneuwly et al.

(10) Patent No.: US 11,620,118 B2
(45) Date of Patent: Apr. 4, 2023

(54) EXTRACTION FROM TREES AT SCALE

(71) Applicant: Oracle International Corporation, Redwood Shores, CA (US)

(72) Inventors: Arno Schneuwly, Effretikon (CH); Nikola Milojkovic, Dietikon (CH); Felix Schmidt, Baden-Daettwil (CH); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 22 days.

(21) Appl. No.: 17/175,250

(22) Filed: Feb. 12, 2021

(65) Prior Publication Data
US 2022/0261228 A1  Aug. 18, 2022

(51) Int. Cl.
*G06F 8/41* (2018.01)
*G06N 20/00* (2019.01)

(52) U.S. Cl.
CPC .............. *G06F 8/427* (2013.01); *G06N 20/00* (2019.01)

(58) Field of Classification Search
USPC ........................................................ 717/143
See application file for complete search history.

(56) References Cited

U.S. PATENT DOCUMENTS

| | | | | |
|---|---|---|---|---|
| 5,822,592 | A | 10/1998 | Zhu | |
| 8,738,617 | B2 * | 5/2014 | Brown | F16H 37/02 706/14 |
| 9,009,687 | B2 | 4/2015 | Caira | |
| 11,288,319 | B1 * | 3/2022 | Das | G06F 40/56 |

(Continued)

FOREIGN PATENT DOCUMENTS

| | | | |
|---|---|---|---|
| EP | 2128798 | 12/2009 | |
| WO | WO-2018107128 A1 * | 6/2018 | ............ G06N 20/00 |

OTHER PUBLICATIONS

"Machine Learning: What it is and Why it Matters"; SAS.com website [full URL in ref.]; as captured by the Wayback Machine Internet Archive (archive.org) on May 8, 2020 (Year: 2020).*

(Continued)

*Primary Examiner* — Wei Y Zhen
*Assistant Examiner* — Clint Thatcher
(74) *Attorney, Agent, or Firm* — Hickman Becker Bingham Ledesma LLP; Brian N. Miller

(57) ABSTRACT

Herein are machine learning (ML) feature processing and analytic techniques to detect anomalies in parse trees of logic statements, database queries, logic scripts, compilation units of general-purpose programing language, extensible markup language (XML), JavaScript object notation (JSON), and document object models (DOM). In an embodiment, a computer identifies an operational trace that contains multiple parse trees. Values of explicit features are generated from a single respective parse tree of the multiple parse trees of the operational trace. Values of implicit features are generated from more than one respective parse tree of the multiple parse trees of the operational trace. The explicit and implicit features are stored into a same feature vector. With the feature vector as input, an ML model detects whether or not the operational trace is anomalous, based on the explicit features of each parse tree of the operational trace and the implicit features of multiple parse trees of the operational trace.

22 Claims, 6 Drawing Sheets

(56) References Cited

U.S. PATENT DOCUMENTS

| | | | |
|---|---|---|---|
| 2014/0101117 | A1 | 4/2014 | Uzzaman |
| 2018/0060211 | A1 | 3/2018 | Allen |
| 2018/0060220 | A1 | 3/2018 | Yao |
| 2018/0357221 | A1* | 12/2018 | Galitsky ................ G06F 40/35 |
| 2019/0018614 | A1 | 1/2019 | Balko |
| 2019/0236134 | A1* | 8/2019 | Galitsky ................ G06F 40/35 |
| 2019/0370604 | A1* | 12/2019 | Galitsky ................ G06F 40/35 |
| 2020/0045049 | A1 | 2/2020 | Apostolopoulos |
| 2020/0065342 | A1* | 2/2020 | Panuganty ............ G06F 16/632 |
| 2020/0076840 | A1 | 3/2020 | Peinador |
| 2020/0265195 | A1* | 8/2020 | Galitsky .............. G06F 40/253 |
| 2021/0103703 | A1* | 4/2021 | Galitsky ............. G06Q 30/016 |
| 2022/0197917 | A1 | 6/2022 | Schneuwly et al. |
| 2022/0198294 | A1 | 6/2022 | Schneuwly et al. |

OTHER PUBLICATIONS

Cai et al., "An Abstract Syntax Tree Encoding Method for Cross-Project Defect Prediction", IEEE, dated Nov. 15, 2019, 10 pages.
Hamilton et al., "Inductive Representation Learning on Large Graphs", 31st Conference on Neural Information Processing Systems (NIPS 2017), Long Beach, CA, USA, 11 pages.
Grover et al., "node2vec: Scalable Feature Learning for Networks", KDD '16, Aug. 13-17, 2016, San Francisco, CA, USA, 10 pages.
Gibert et al., "Graph Embedding in Vector Spaces", GbR'2011 Mini-tutorial, dated 2011, 66 pages.
Garcia-Duran et al. "Learning Graph Representations with Embedding Propagation", 31st Conference on Neural Information Processing Systems (NIPS 2017), 12 pages.
Flegel et al., "Detection of Intrusions and Malware, and Vulnerability Assessment", Springer, 6th International Conference, DIMVA 2009 Como, Italy,dated Jul. 9-10, 2009, 232 pages.
Allandadian et al., "A Nonlinear Optimization Method with Focus", dated 2018, 1 page.
Collins et al., "Convolution Kernels for Natural Language", dated 2002, 8 pages.
Huang et al., "Online System Problem Detection by Mining Patterns of Console Logs", dated Dec. 2009, 11 pages.
Bockermann et al., "Learning SQL for Database Intrusion Detection Using Context-Sensitive Modelling", DIMVA dated 2009, LNCS 5587, 10 pages.
Bengio et al., "Learning Deep Architectures for AI", dated 2009, 71 pages.
Apel et al., "Learning SQL for Database Intrusion Detection using Context-sensitive Modelling", dated 2009, 33 pages.
An et al., "Variational Autoencoder based Anomaly Detection Using Reconstruction Probability", 2015-2 Special Lecture on IE, dated Dec. 27, 2015, 18 pages.
Alon, et al., "code2vec: Learning Distributed Representations of Code", Proc. ACM Program. Lang., vol. 3, No. POPL, Article 40. Publication date: Jan. 2019, 29 pages.
Alon et al., "A General Path-Based Representation for Predicting Program Properties" dated Apr. 22, 2018, 16 pages.
Ding et al., "PCA-Based Network Traffic Anomaly Detection" Tsinghua Science and Technology, vol. 21, No. 5, Oct. 2016, 10 pages.
Scholkopf et al. "Estimating the Support of a High-Dimensional Distribution", dated Nov. 27, 1999, 28 pages.
Zhang et al., "Automated IT System Failure Prediction: A Deep Learning Approach", dated 2016, 11 pages.
Zhang et al, "Network Anomaly Detection Using One Class Support Vector Machine", Proceedings of the International MultiConference of Engineers and Computer Scientists 2008 vol. I, Mar. 19, 2008, 5 pages.
Yen et al., "Beehive: Large-Scale Log Analysis for Detecting Suspicious Activity in Enterprise Networks", ACSAC '13 dated Dec. 9-13, 2013, New Orleans, Louisiana, USA, 10 pages.
Yamanishi et al., "Dynamic Syslog Mining for Network Failure Monitoring", KDD'05 Aug. 21-24, 2005, Chicago, Illinois, USA, 10 pages.
Yamaguchi et al., "Generalized Vulnerability Extrapolation using Abstract Syntax Trees", ACSAC '12 Dec. 3-7, 2012, Orlando, Florida USA, 10 pages.
Xu et al. "Detecting Large-Scale System Problem by Mining Console Logs", SOSP'09, Oct. 11-14, 2009, 15 pages.
Hamilton et al., "Representation Learning on Graphs: Methods and Applications", Copyright 2017 IEEE, 24 pages.
Wei et al., "Graph embedding based feature selection", Neurocomputing 93 dated May 17 2012, 11 pages.
He et al., "A Reusable SQL Injection Detection Method for Java Web Applications", KSII Transactions on Internet and Information Systems vol. 14, No. 6, dated Jun. 2020, 15 pages.
Perozzi et al., "DeepWalk: Online Learning of Social Representations", dated 2014, 10 pages.
Mou et al., "Building Program Vector Representations for Deep Learning", dated Sep. 11, 2014, 11 pages.
Maglaras et al. "A real time OCSVM Intrusion Detection module with low overhead for SCADA systems", International Journal of Advanced Research in Artificial Intelligence, vol. 3, No. 10, 2014, 9 pgs.
Liu et al., "Isolation Forest", dated 2008, 10 pages.
Jimenez et al., "On the Impact of Tokenizer and Parameters on N-Gram Based Code Analysis", dated 2018, 12 pages.
Zhou et al., "Tree Kernel-based Relation Extraction with Context-Sensitive Structured Parse Tree Information", dated Jun. 2007, 9 pages.
Wolfram MathWorld, "Inner Product", https://mathworld.wolfram.com/InnerProduct.html, dated 2004, 2 pages.
Schneuwly, U.S. Appl. No. 17/131,299, filed Dec. 22, 2020, Notice of Allowance and Fees Due, dated Aug. 5, 2022.

\* cited by examiner

EXTRACTION FROM TREES AT SCALE

RELATED CASES

The following related applications are incorporated in their entirety herein:

U.S. patent application Ser. No. 16/122,398 titled MALICIOUS ACTIVITY DETECTION BY CROSS-TRACE ANALYSIS AND DEEP LEARNING filed on Sep. 5, 2018 by Juan Fernandez Peinador et al;

U.S. patent application Ser. No. 17/131,944 titled GENERALIZED PRODUCTION RULES-N-GRAM FEATURE EXTRACTION FROM ABSTRACT SYNTAX TREES (AST) FOR CODE VECTORIZATION filed Dec. 23, 2020 by Arno Schneuwly et al; and U.S. patent application Ser. No. 17/131,299 titled KERNEL SUB SAMPLING FOR AN ACCELERATED TREE SIMILARITY COMPUTATION filed Dec. 22, 2020 by Arno Schneuwly et al.

FIELD OF THE INVENTION

The present invention relates to machine learning for detection of anomalous logic syntax. Herein is acceleration for analysis of an operational trace that contains parse trees such as suspicious database queries.

BACKGROUND

Whether intentionally or accidentally, an abnormal logic statement such as a structured query language (SQL) statement may harm a computer process, stored data, and/or personal privacy. A technical problem with detecting an anomalous logic statement is that the statement may contain significant complexity and occur with a problem space of billions of possible distinct statements. Thus, it may be infeasible or impossible to detect that a statement is anomalous until runtime when the statement is submitted for execution. Additionally, latency and accuracy of anomaly detection may be crucial to system security and throughput and may be satisfied by a machine learning (ML) model.

Representing or summarizing a parse tree of a suspect logic statement in a format that an ML model can leverage is another technical problem because of significant flexibility in the internal organization of the logic statement. For example, a programming language is defined by a formal grammar. The grammar defines a set of terminal and non-terminal symbols. The terminal symbols represent acceptable tokens in the source code. In a parse tree such as an abstract syntax tree (AST), those tokens are the leaf nodes. The non-terminal symbols are the set of possible non-leaf nodes in the tree. The grammar defines which combinations of tree nodes are possible according to production rules, which may allow for virtually infinite possible parse trees.

In any case, ML algorithms may require a numeric representation of the input data. For example, an ML model such as an artificial neural network (ANN) may primarily operate by numeric calculations. There are various encoding strategies for ASTs of source logic. A popular way entails explicitly capturing paths of different lengths in the parse tree. That is a straightforward and lightweight way. However, that approach only partially captures structural information of the tree. For example, the captured contextual scope depends on a selected fixed length of the selected paths and thus on configuration settings such as according to model hyperparameter tuning that is fragile and computationally expensive.

Path extraction is an explicit feature extraction strategy that does not scale because the number of features can grow rapidly with an increasing number of available tokens. For example because feature vectors for a same ML model should have a same width, path extraction requires that a feature vector be wide enough to accommodate a biggest expected tree such as a tallest tree, a widest tree, and/or a tree that contains the most tree nodes. Thus, parse trees are difficult to accommodate in feature vectors without significantly lossy encoding, which has limited the evolution of ML analysis of parse trees.

DETAILED DESCRIPTION

Figure 1:
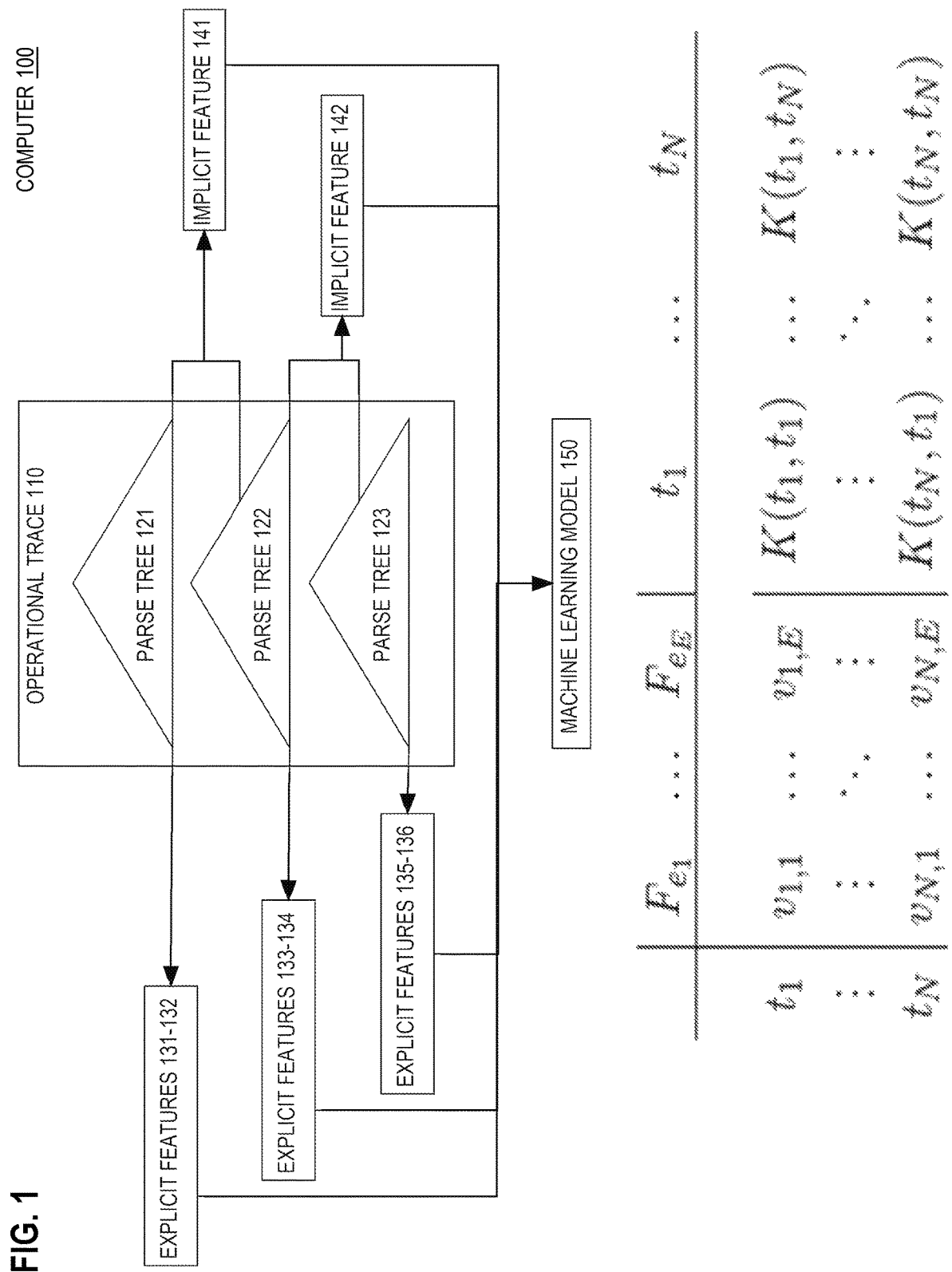
FIG. 1 is a block diagram that depicts an example computer that accelerates analysis, by a machine learning (ML) model, of an operational trace that contains parse trees such as of suspicious database queries.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein are various embodiments for analyzing and comparing parse trees, including tree summarization techniques and machine learning (ML) techniques for applications such as computer security. An exemplary embodiment uses provides a behavioral database intrusion detection system that analyzes a continuous flow of structured query language (SQL) statements being applied to a database. Various kinds and complexities of attacks are detected despite being undetectable by rule-based systems. SQL statements are parsed and represented by respective parse trees such as an abstract syntax tree (AST) that is used to extract so-called explicit features to create a vector for each query.

Explicit feature extraction methods capture relationships of content and structure within an individual parse tree, which may have low computational complexity that accelerates feature extraction. Example explicit features of a parse tree include:

number of tree nodes
  average number of child nodes per node
  length of longest path from tree root to any tree leaf
  a count of nodes or paths that match a predefined pattern node types such as according to a formal grammar of the parser that generated the parse tree Explicit features are expressive and useful for diagnostic purposes such as ML explainability (MLX) such as explaining why an ML model classified SQL statement(s) as anomalous or non-anomalous in development or production. However scalability may be a problem because, with a growing tree size, the feature space may grow too large and exhaust computation resources under certain circumstances.

When extracting path-related explicit features from an AST, the feature space will grow rapidly if the literals (leaf nodes) of the AST are taken into account. For example, an AST of a SQL statement may have tens or hundreds of tree nodes. Likewise, SQL is a rich language such that an AST may contain hundreds of distinct values at the leaf nodes.

Herein, ignoring leaves and only processing non-leaf nodes of the AST decreases the size of the feature space because the set of possible non-leaf nodes is limited by the formal grammar and syntax of SQL itself. Such shrinking of the explicit feature space saves time and space for explicit feature extraction.

A database workflow can have millions of queries such that feature space and computation time are major challenges for using ML. For example, extracting tree paths from an AST including literals for each query generates too large of a feature space. With the insight that some queries occurring in a same time interval have strong correlation among them, the behavioral anomaly detection system aggregates session log entries into traces to detect whether or not a specific sequence of actions is anomalous.

Each log entry has different fields in addition to the SQL statement such as session identifier, username, hostname, and timestamp. The system may aggregate log entries with a same session identifier into a trace that does not include other interleaved log entries with different session identifiers that belong to other traces. Instead of detecting that an individual SQL statement is anomalous, an ML model can analyze a trace containing related statements as a unit, which has the following novel advantages.

A disadvantage of explicit features is that they do not well represent local correlation. For example, some features may depend on multiple parse trees that a trace contains. Herein, a so-called implicit feature is necessarily derived from multiple parse trees. Other feature approaches involving multiple parse trees have serious scalability problems. For example, computing pairwise similarities for all parse trees in a system takes too much time. It is infeasible to pairwise compare all queries in a real-time system with a continuous flow of queries. Limiting implicit features to parse trees in a single trace provides novel acceleration based on greatly decreased combinatorics. In other words, partitioning traffic into traces tames analytic complexity.

Implicit features capture more context from parse trees than explicit feature extraction strategies. For example, convolutional tree kernels herein compute similarity between parse trees to generate a feature space. The implicit feature space scales well because its size does not depend on tree size, but instead on the number of parse trees in a trace that usually is few. Implicit features scale according to only the number of parse trees and not according to the tree content and grammar size. For ASTs of SQL statements, literals (tree leaves) in the statements do not affect the number of features. Thus, a full tree can be taken into account without risk of feature space expansion.

Herein is a hybrid approach that synergistically combines explicit and implicit features in a novel and strategic way that leverages the strengths of both to achieve feature vectors that are compact, feature extraction that is fast, and ML inferencing that has increased accuracy. This hybrid approach mitigates feature space size and tree kernel complexity with an optimal balance between rich features and compact feature vectors. This innovation benefits ML systems generally so long as datasets include logical graph or tree data structures.

The intra-trace similarity takes into account the full abstract syntax trees and exploits local correlation within a trace. However, the explicitly extracted AST features (without literals) capture global correlation within a workload. Those two sets of features provide a smaller feature space to precisely represent the information in ASTs.

When combined with explicit features, intra-trace similarity solves the following challenges:
  decrease the number of explicitly extracted tree features by ignoring literals;
  compensate for the lack of literals in the explicit feature space by intra-trace similarities using tree kernels;
  make tree kernels computationally practical by partitioning a workload into traces.

Intra-trace similarity for large workloads leads to experimentally-verified increased performance in an example anomaly detection system. As explained herein, a hybrid approach of parser production rules and tree kernels leads to increased detection of attacks and less false positives. The experimentally-verified example anomaly detection system includes the following cooperating components:
  Parser: A parser compatible for the desired programming language generates an AST for the given input logic. The parser generator ANTLR with MySQL and PL/SQL grammars was used to create parsers written in C++.
  Tree Kernel: Accelerated calculation of implicit features was provided by the convolutional tree kernel algorithm presented in related U.S. patent application Ser. No. 17/131,299.
  Bag of Production Rules: Accelerated extraction of rich explicit features based on tree paths and generalized production rules was provided by techniques presented in related U.S. patent application Ser. No. 17/131,944.
  SQL Anomaly Detection Pipeline: Accelerated implicit feature calculation based on intra-trace similarity.

In an embodiment, a computer identifies an operational trace that contains multiple parse trees. Values of explicit features are generated from a single respective parse tree of the multiple parse trees of the operational trace. Values of implicit features are generated from more than one respective parse tree of the multiple parse trees of the operational trace. The explicit and implicit features are stored into a same feature vector. With the feature vector as input, an ML model detects whether or not the operational trace is anomalous, based on the explicit features of each parse tree of the operational trace and the implicit features of multiple parse trees of the operational trace. As used with techniques herein, this approach accelerates feature collection, decreases feature vector size, and increases ML model accuracy. Embodiments may use ML feature processing and analytics herein to detect anomalies in parse trees of logic statements, database queries, logic scripts, compilation units of general-purpose programing language, extensible markup language (XML), JavaScript object notation (JSON), and document object models (DOM).

1.0 Example Computer

FIG. 1 is a block diagram that depicts an example computer 100, in an embodiment. Computer 100 accelerates analysis, by machine learning model 150, of operational trace 110 that contains parse trees 121-123 such as parse trees of suspicious database queries. Computer 100 may be one or more of a rack server such as a blade, a personal computer, a mainframe, a virtual computer, or other computing device.

Computer 100 extracts or derives features 131-136 and 141-142 from parse trees 121-123 that are contained in operational trace 110. Operational trace 110 represents a sequence of logic statements (not shown) that may or may not be suspicious, malicious, or otherwise indicative of a malfunction. For example, the sequence of logic statements may be received in a logic script, a source code file for a programming language, or in a live or logged command session such as in a console shell or in a database session through open database connectivity (ODBC). From each logic statement that operational trace 110 is based on, a respective parse tree 121-123 is generated.

1.1 Parse Tree

Parse trees 121-123 are hierarchical data structures. In an embodiment, structured contents such as text are represented by parse trees 121-123 that may be parse trees or abstract syntax trees (ASTs). In an embodiment, each of parse trees 121-123 represents a respective logic statement such as a database query such as structured query language (SQL) or a statement in a programing language such as a code source language such as a scripting language. In an embodiment, each of parse trees 121-123 instead represents a hierarchical document such as a document object model (DOM) for extensible markup language (XML) or JavaScript object notation (JSON).

Parse trees 121-123 consist of interconnected tree nodes. Parse trees and tree nodes are data structures stored in memory. A parent node may be connected to a child node by a referential link, such as a memory address pointer or array index, that may be stored in the parent node and/or child node and refers to the other node. Tree traversal may entail dereferencing such links between nodes. Tree traversal may occur in an enumeration ordering such as preorder, in order, or post order visitation of a parent node and child nodes. Regardless of ordering, tree traversal may be based on recursion, iteration, and/or queueing. In an embodiment, detecting the degree of a parent node entails counting links that connect the parent node to direct child nodes.

Tree nodes need not be contiguously stored in memory. Tree nodes may be dynamically allocated in memory. Subtrees are composable. For example, adding a subtree to a parse tree may entail linking the root node of the subtree, as a child node, to a parent node already in the parse tree. A tree node may contain or otherwise be associated with data fields that, by inspection, may facilitate comparison of tree nodes or subtrees such as discussed later herein.

As discussed later herein, machine learning (ML) model 150 analyzes operational trace 110 by analyzing parse trees 121-123. However, direct analysis of parse trees 121-123 may be more or less computationally infeasible such as when: a) parse tree 121 contains tens or hundreds of tree nodes that each have multiple attributes, and/or b) parse tree 121 might match tens or hundreds of predefined interesting patterns. Instead, feasibility may depend on indirect analysis of parse trees 121-123 by analyzing compact and meaningful features (i.e. summaries, statistics, and/or metadata that describe parse trees 121-123 individually or collectively) as follows.

1.2 Explicit Feature

Parse tree 121 is characterized by features 131-132 and 141 as follows. Each of explicit features 131-136 is extracted from a single respective parse tree more or less by direct inspection. For example multiple explicit features 131-132 are extracted solely from parse tree 121.

From each of parse trees 121-123 are extracted a similar respective set of explicit features. For example, explicit feature 131, 133, and 135 have a similar meaning. For example, explicit feature 131 may be a count of tree nodes in parse tree 121, and explicit feature 132 may be a count of paths within parse tree 121 that match a predefined pattern.

In any case, the amount of explicit features is linearly proportional to the amount of parse trees in operational trace 110. If parse trees 121-123 conform to a formal grammar, then the amount of explicit features is further proportional to the amount of parser production rules and/or symbols in the grammar. Techniques for extracting counts of matching tree paths as explicit features and for extracting explicit features based on formal grammars are presented in related U.S. patent application Ser. No. 17/131,944.

1.3 Implicit Feature

Each of implicit features 141-142 is inferred or derived based on comparison or other analysis of respective multiple parse trees in operational trace 110. For example, implicit feature 141 is inferred, derived, or calculated based on parse trees 121-122. In various embodiments, each of implicit features 141-142 is based on a respective same or different amount of parse trees.

In the shown embodiment, each implicit feature 141-142 is based on a respective distinct pair of two parse trees. In various embodiments, respective subsets of parse trees for implicit features 141-142 do or do not have some parse tree(s) in common. For example, implicit features 141-142 are both partially based on same parse tree 122.

In an embodiment not shown, a respective implicit feature is derived for exhaustively all possible distinct pairs of parse trees 121-123. For example although not shown, a third implicit feature may be based on parse trees 121 and 123. For example, from ten parse trees may be exhaustively derived fifty-five pairings and fifty-five implicit features.

In any case, the amount of implicit features is approximately quadratically proportional to the amount of parse trees in operational trace 110. Because the amount of parse trees in operational trace 110 is usually or always less than the amount of explicit features per parse tree, explicit features in aggregate typically consume more time to generate and more space to store. In an embodiment, each implicit feature measures a similarity between a distinct pair of parse trees in operational trace 110. Thus, all implicit features 141-142 together effectively measure homogeneity within operational trace 110. Techniques for comparing parse trees and subtrees to calculate implicit features are presented in related U.S. patent 17/131,299.

1.4 Feature Matrix

Various embodiments may store features 131-136 and 141-142 in various ways. Shown at the bottom of FIG. 1 is a two-dimensional matrix for storing features 131-136 and 141-142 in an embodiment as follows. At the very top of the matrix is a header row, and at the very left of the matrix is a header column. Those two headers are demonstrative, implied, and not actually stored. The rest of the rows are feature rows, and the rest of the columns are feature columns as follows.

Each feature row stores all of the explicit and implicit features of a respective parse tree in operational trace 110 as follows. The header column refers to parse trees 121-123 as $t^1$ $t_N$ respectively. Thus, the first feature row is for $t^1$ that is parse tree 121, and the last feature row is for $t_N$ that is parse tree 123.

The matrix may have more than three feature rows if operational traces should have more than three parse trees. If an operational trace has less than a predefined maximum amount of parse trees, then zero-filled dummy rows may extend the matrix so that all operational traces have matrices of a same size even though the operational traces contain different amounts of parse trees. That is, a respective matrix is generated for each operational trace, and all of the matrices have a same size.

The matrix is logically vertically partitioned into left and right submatrices such that the left submatrix stores explicit features 131-136 and the right submatrix stores implicit features 141-142 as follows. In the left part of the first feature row, explicit feature values $v_{1,1} \ldots v_{1,E}$ respectively store explicit features 131-132 such that $v_{1,1}$ stores explicit feature 131 and $v_{1,E}$ stores explicit feature 132. Each parse tree 121-123 has a same amount of explicit features, which may be more than two, in which case the left submatrix has more than two explicit feature columns. Likewise, $v_{N,1}$ stores explicit feature 135 and $v_{N,E}$ stores explicit feature 136.

Storage of implicit features in the right submatrix is more complex as follows. As explained earlier herein, a respective implicit feature may be derived for exhaustively all possible distinct pairs of parse trees 121-123, including pairing a same parse tree 121 with itself. As explained above, the first feature row is for $t_1$ that is parse tree 121.

Thus, the first feature row has an implicit feature for each pairing of parse tree 121 respectively with parse trees 121-123, including implicit feature 141 that pairs parse trees 121-122. Thus, $K(t_1,t_1)$ is an implicit feature based on pairing parse tree 121 with itself, and $K(t_1,t_N)$ is an implicit feature based on pairing parse tree 121 with parse tree 123. In an embodiment, K( ) compares two parse trees.

In an embodiment, K( ) evaluates by calculation to a number. In an embodiment, K( ) measures a similarity between two parse trees. In an embodiment, K( ) is a convolutional tree kernel based on techniques presented in related U.S. patent application Ser. No. 17/131,299.

In an embodiment, the pair of parse trees for K( ) is symmetric such that $K(t_1,t_N)$ and $K(t_N,t_1)$ are redundant because they are a same implicit feature that is calculated once, not twice. Thus, the right submatrix is symmetric along its diagonal such that almost half of the right submatrix is redundant and reuses previous calculations.

1.5 Feature Vector

Features 131-136 and 141-142 may be encoded and stored into a feature vector (not shown) that machine learning (ML) model 150 accepts as input. For example in an embodiment, the feature vector includes the matrix discussed above. Even though the matrix is two-dimensional, in an embodiment feature rows of the matrix are concatenated together to form a one-dimensional array that may be stored in the feature vector that may also be one-dimensional. From each operational trace may be generated a respective feature vector.

An embodiment may supplement or replace the two-dimensional matrix with a one-dimensional statistics vector that contains means, minimums, maximums, and/or standard deviations respectively for some or all feature columns individually of the matrix. For example, if the statistics vector, instead of the matrix, is stored in the feature vector, then dimensionality reduction is achieved. If both the statistics vector and the matrix are stored in the feature vector, then feature enrichment is achieved.

Based on the feature vector, ML model 150 generates an inference that characterizes operational trace 110. Discussed later herein are: a) supervised and unsupervised training of ML model 150, and b) architectures for ML model 150 such as autoencoder, principal component analysis (PCA), or random forest.

In various embodiments, the inference by ML model 150 is a classification label such as anomalous or non-anomalous, a prediction, a score such as an anomaly score, or a probability such as a statistical likelihood that operational trace 110 is anomalous. In an embodiment, the inference consists of a respective probability for each label in a predefined set of mutually-exclusive classification labels. In an anomaly detection embodiment, an anomaly is detected when an inferred anomaly score or probability exceeds a predefined threshold. Various anomaly detection embodiments may cause one or more of various reactions when an anomaly is detected, such as logging operational trace 110 as suspicious or abnormal, rejecting operational trace 110 instead of executing it, raising an alert, diverting operational trace 110 for more intensive manual or automatic inspection, and/or adding operational trace 110 to a training corpus for retraining ML model 150.

2.0 Example Feature Capture

Figure 2:
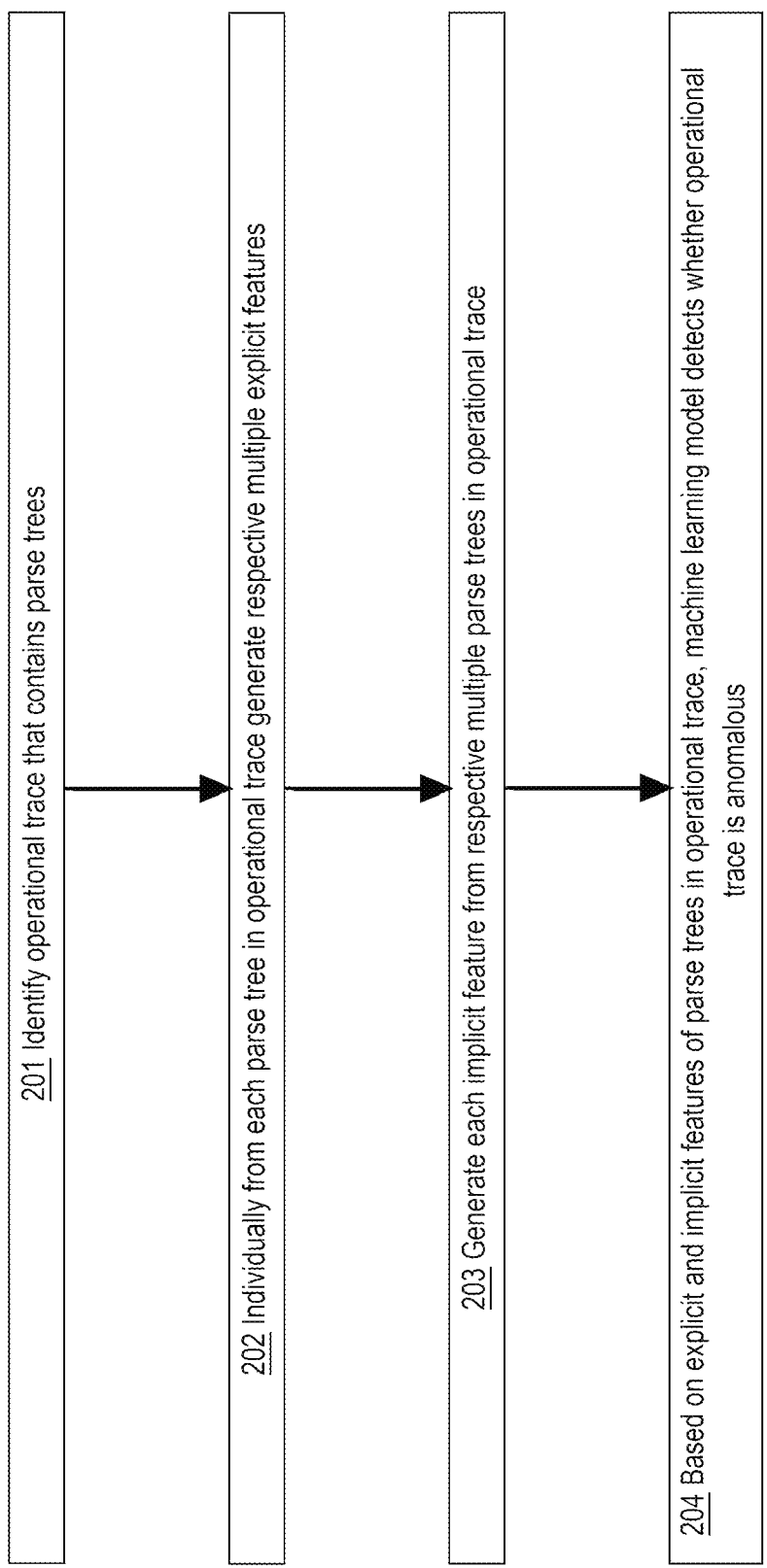
FIG. 2 is a flow diagram that depicts an example computer process that generates features from parse trees in an operational trace for anomaly detection by an ML model.

FIG. 2 is a flow diagram that depicts an example process that computer 100 performs to generate features 131-136 and 141-142 from parse trees 121-123 in operational trace 110 for anomaly detection by ML model 150. FIG. 2 is discussed with reference to FIG. 1.

Depending on the embodiment, step 201 obtains parse trees 121-123 from live data such as in batches or by real time streaming or from recorded/logged historical data. In an embodiment, step 201 receives operational trace 110 as a self-contained data structure that contains parse trees 121-123 as data structures. In an embodiment, parse trees 121-123 already exist as self-contained data structures but reside within a larger collection of parse trees such that operational trace 110 is not readily apparent and step 201 should identify operational trace 110 and parse trees 122-123.

For example in a sequence of many parse trees, operational trace 110 may contain a next fixed amount of parse trees. In an embodiment, which parse trees of a variable amount does operational trace 110 contain may depend on system semantics. For example, a multi-statement database transaction may consist of parse trees 121-123.

In an embodiment, which parse trees of a variable amount does operational trace 110 contain may depend on recency. For example, parse trees received in the last ten minutes may consist of parse trees 121-123. In an embodiment, a sliding window defines which parse trees does operational trace 110 contain. For example, the window may have a fixed temporal duration such as ten minutes and slide (i.e. advance) one or more minutes at a time. Likewise, the window may contain a fixed amount of parse trees and slide one or more parse trees at a time. That is with a sliding window, same parse tree 121 may occur in one or multiple traces due to overlapping traces caused by incremental sliding less than the window size.

In an embodiment, parse trees 121-123 do not already exist, and step 201 generates them from original data. For example, parse trees 121-123 may be parse trees that step 201 generates by parsing respective logic statements or semi-structured documents. For example, each line of text in a console log or logic script may be parsed into a respective parse tree. Techniques for identification and encapsulation of operational trace 110 are presented in related U.S. patent application Ser. No. 16/122,398. Techniques for generating parse trees according to a formal grammar are presented in related U.S. patent application Ser. No. 17/131,944.

Individually from each parse tree 121-123 in operational trace 110, step 202 generates similar sets of respective multiple explicit features such as explained earlier herein. Step 203 generates each implicit feature 141-142 from respective multiple parse trees in operational trace 110 such as discussed earlier herein. Steps 202-203 may concurrently occur for same operational trace 110. Each of features 131-133 and/or 141-142 may be concurrently generated for same operational trace 110.

In step 204, based on explicit features 131-133 and implicit features 141-142 of parse trees 121-123 in operational trace 110 such as according to a feature vector as discussed earlier herein, ML model 150 detects whether or not operational trace 110 is anomalous. For example, step 204 may detect and react to operational trace 110 being anomalous or non-anomalous as discussed earlier herein. In an embodiment with pipeline parallelism: step 201 is a first stage of a processing pipeline; steps 202-203 are a second stage; and step 204 is a third stage. In a respective way, each of those three stages may concurrently process a different operational trace.

3.0 Feature Capture Activities

Figure 3:
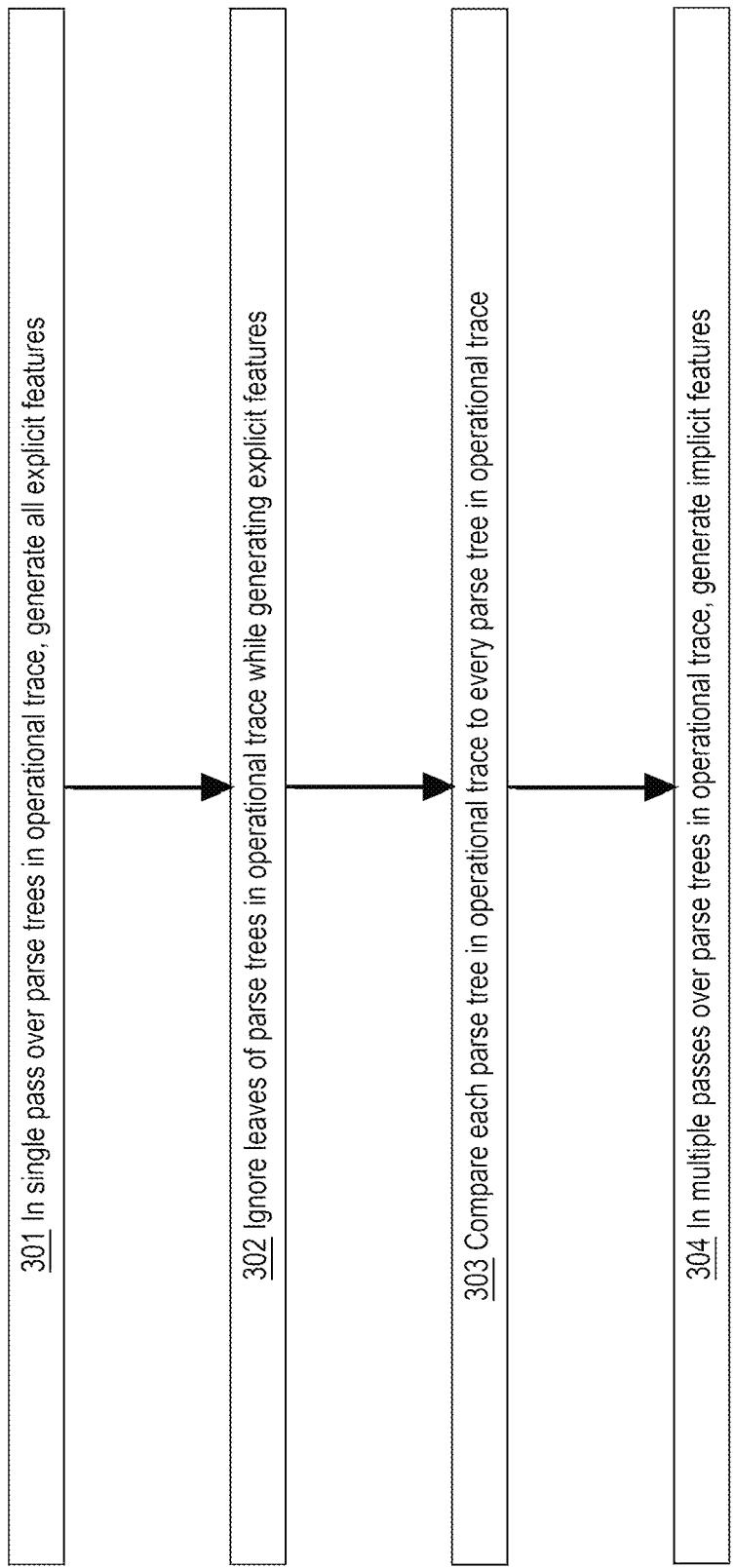
FIG. 3 is a flow diagram that depicts an example computer process that generates features from parse trees in an operational trace.

FIG. 3 is a flow diagram that depicts an example process that computer 100 performs to generate features 131-136 and 141-142 from parse trees 121-123 in operational trace 110. FIG. 3 is discussed with reference to FIG. 1.

As explained earlier herein, explicit features are extracted or calculated based on direct inspection of an individual parse tree. Thus in a single pass over parse trees 121-123 in operational trace 110, step 301 generates all explicit features 131-136. Within the single pass over all parse trees 121-123 may be a respective single pass over each individual parse tree that may entail a single pass over all tree nodes in that parse tree such as by preorder, post order, or in order tree traversal as explained earlier herein. Thus, step 301 may make a single pass over all tree nodes in operational trace 110. In a single pass, step 301 may extract tree paths of various lengths from parse tree 121 by recursion or queuing. Tree path extraction and summarization techniques are presented in related U.S. patent Ser. No. 17/131,944.

Content of a leaf node in parse tree 121 may be circumstantial. For example, database queries may be automatically generated, based on textual templates or prepared statements, with some variables or placeholders for primary and foreign keys or for filtration constants such as literals. In other words, a client application may generate many queries that are structurally identical such that only the leaves of their parse trees differ, which is neither suspicious nor anomalous.

Thus, differences in contents of leaf nodes may be ignored in some explicit feature embodiments. For example, SQL clauses "IN(0,1)" and "IN(1,2)" should not be considered dissimilar. In an embodiment, step 302 ignores leaves of parse trees 121-123 while generating explicit features 131-136. Step 302 may be part of step 301 that entails a single pass.

In an embodiment, step 303 compares each parse tree in operational trace 110 to every parse tree 121-123 in operational trace 110 such as by pairwise comparison to derive implicit features 141-142 as discussed earlier herein. Step 303 may be part of step 304 as follows. Because same parse tree 122 occurs in two pairings respectively with parse trees 121 and 123 to derive respective implicit features 141-142, parse tree 122 is repeatedly compared to multiple respective parse trees. Thus, step 304 generating implicit features from operational trace 110 entails multiple passes over same parse trees 121-123. Techniques for deriving implicit features based on pairwise parse tree comparison are discussed later herein and in related U.S. patent application Ser. No. 17/131,299.

4.0 Implicit Feature Derivation

Figure 4:
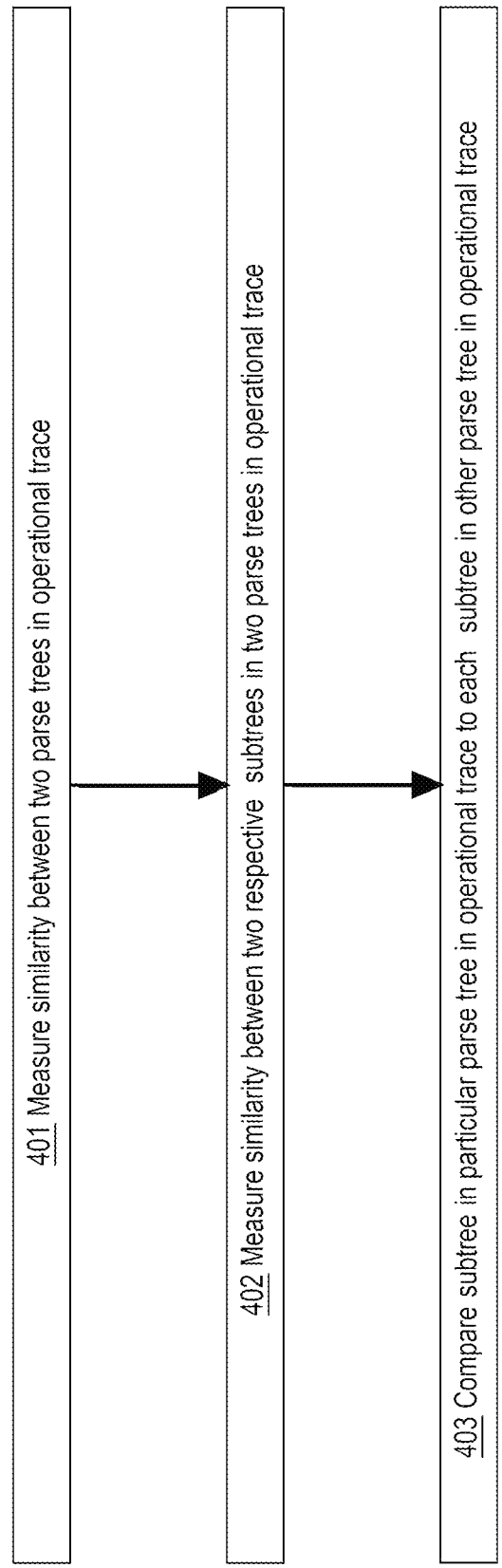
FIG. 4 is a flow diagram that depicts an example computer process that generates implicit features based on whole and partial comparisons of parse trees in an operational trace.

FIG. 4 is a flow diagram that depicts an example process that computer 100 performs to generate implicit features 141-142 based on whole and partial comparisons of parse trees 121-123 in operational trace 110. FIG. 4 is discussed with reference to FIG. 1.

Step 401 measures structural similarity between two parse trees 121-122 in operational trace 110. For example, step 401 may calculate a similarity score. The similarity score is increased when parse trees 121-122 contain a same or similar arrangement of some tree nodes.

In an embodiment, two parse trees compared by step 401 may be a same parse tree. For example, step 401 may compare parse tree 121 to itself. For example, self-comparing parse tree 121 to parse tree 121 may generate a higher similarity score than self-comparing parse tree 122 to parse tree 122. For example as explained below, parse tree 121 may represent a structured query language (SQL) query that specifies a union of two subqueries that are somewhat similar, and parse tree 122 may not have any subqueries. Thus, comparing a parse tree to itself is neither trivial nor insignificant for summarizing the structure of the parse tree.

Step 402 measures a similarity between two respective subtrees in two parse trees 121-122 in operational trace 110. For example in SQL, a subtree may correspond to a subquery, a clause such as a WHERE clause, an expression such as one condition in a compound predicate, or a single term such as a column name.

Step 403 compares a subtree in parse tree 121 in operational trace 110 to each subtree in parse tree 122 in operational trace 110. In other words, all of parse tree 122 is scanned for possibly multiple matches of parse tree 121's subtree. Step 402 may be part of step 403. Every subtree contains at least one leaf node. A subtree may be as small as a single leaf node. Various embodiments do or do not consider a whole parse tree to also be a subtree. In most embodiments, a root node of a parse tree cannot be a leaf node. In most embodiments, a parse tree always has more subtrees than leaf nodes. Subtrees can be nested such that a root node of a smaller subtree is a non-root node in an enclosing larger subtree. Parse tree and subtree comparison techniques for use by steps 401-403 are presented in related U.S. patent application Ser. No. 17/131,299.

6.0 Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

6.1 Metadata Definitions

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces.

A tablespace is a set of one or more files that are used to store the data for various types of database objects, such as a table. If data for a database object is stored in a tablespace, a database dictionary maps a database object to one or more tablespaces that hold the data for the database object. A database dictionary is referred to by a DBMS to determine how to execute database commands submitted to a DBMS. Database commands can access the database objects that are defined by the database dictionary.

6.2 Database Operation

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, such as Oracle Database 11g. SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, such as with shared access to a set of disk drives and data blocks stored thereon. The nodes in a multi-node database system may be in the form of a group of computers, such as work stations and/or personal computers, that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

6.3 Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
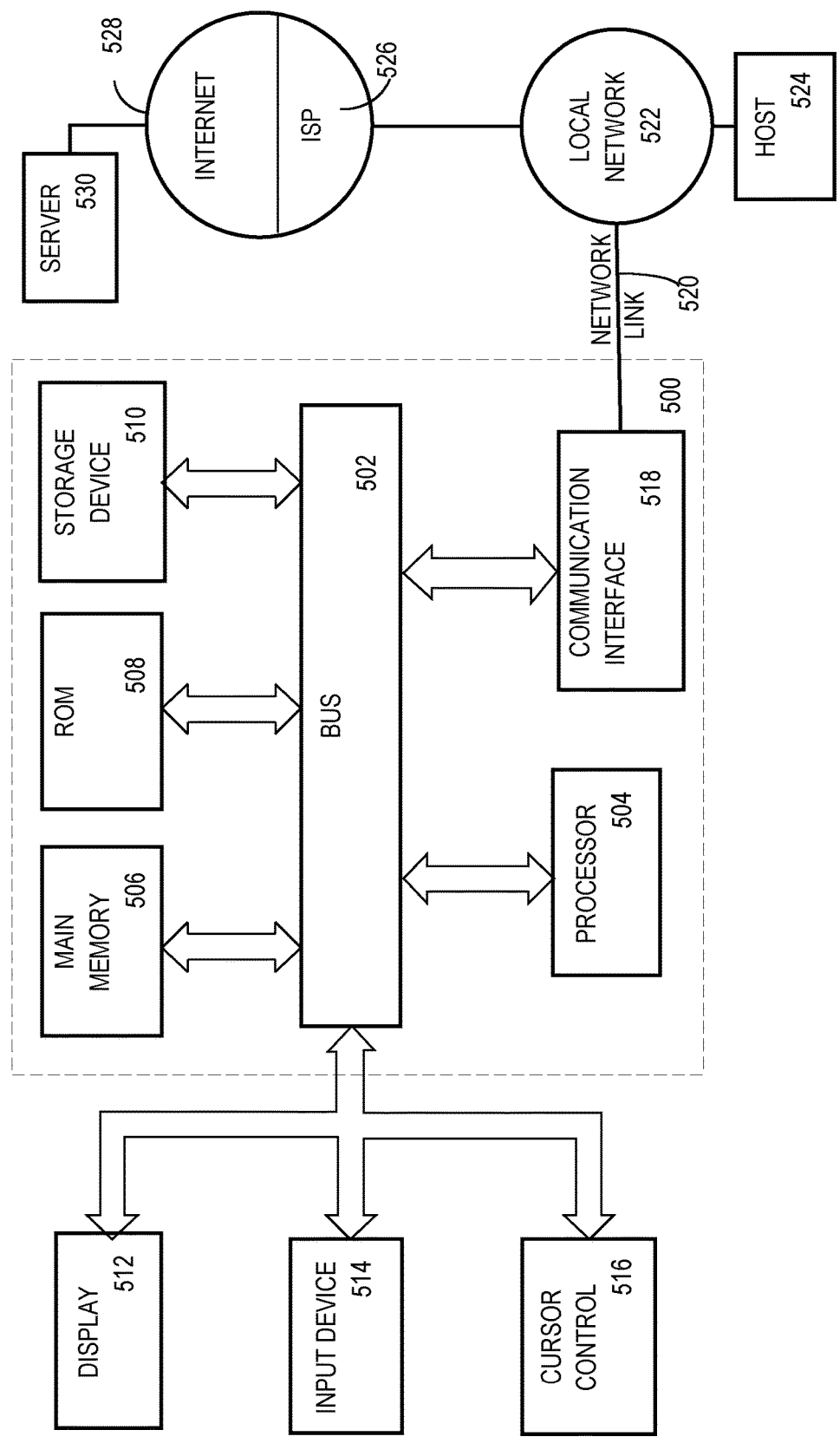
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

Figure 6:
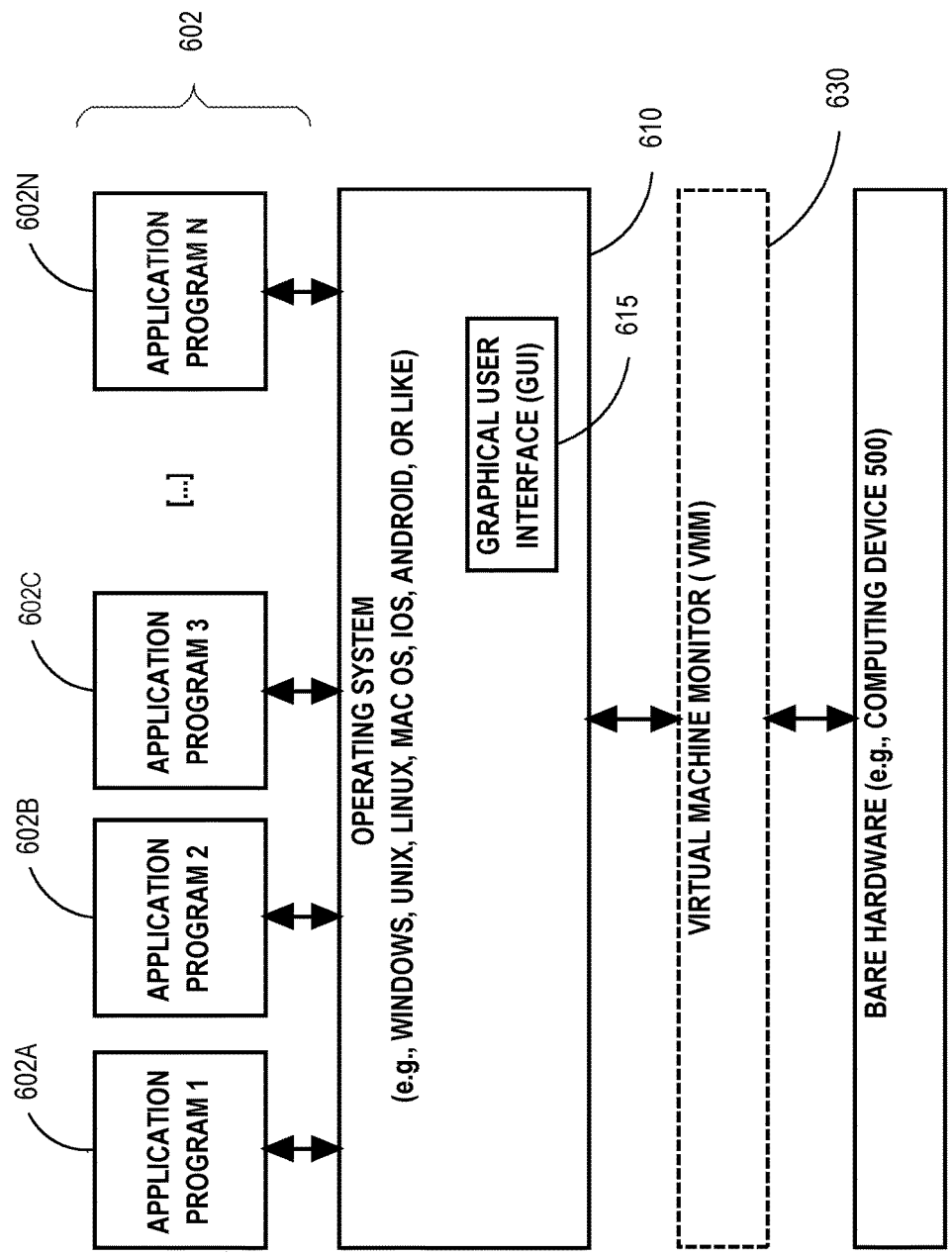
FIG. 6 is a block diagram that illustrates a basic software system that may be employed for controlling the operation of a computing system.

FIG. 6 is a block diagram of a basic software system 600 that may be employed for controlling the operation of computing system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feed forward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing.

Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the dataset, such as with feature bootstrap aggregating (bagging). Therefore, the decision trees gain accuracy as the decision trees grow without being forced to over fit training data as would happen if the decision trees were forced to learn all feature dimensions of the dataset. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   generating a plurality of parse trees, wherein each parse tree of the plurality of parse trees represents a respective logic statement in a sequence of logic statements;
   generating each explicit feature, of a plurality of explicit features, from a single respective parse tree of the plurality of parse trees;
   generating each implicit feature, of a plurality of implicit features, from more than one respective parse tree of the plurality of parse trees;
   detecting, by a machine learning model, that the sequence of logic statements is anomalous, based on:
   a) a feature vector that contains the plurality of explicit features of the plurality of parse trees, and
   b) the plurality of implicit features of the plurality of parse trees; and
   in response to said detecting that the sequence of logic statements is anomalous, retraining, based on a training corpus that contains the sequence of logic statements, the machine learning model;
   wherein the method is performed by one or more computers.

2. The method of claim 1 wherein said generating said implicit feature from said more than one parse tree comprises comparing:
   a first parse tree of the plurality of parse trees, and
   a second parse tree of the plurality of parse trees.

3. The method of claim 2 wherein said comparing said first parse tree and said second parse tree comprises measuring a first similarity between:
   said first parse tree of the plurality of parse trees, and
   said second parse tree of the plurality of parse trees.

4. The method of claim 3 wherein said measuring said first similarity between said first parse tree and said second parse tree comprises measuring a second similarity between:
   a first subtree of said first parse tree of the plurality of parse trees, and
   a second subtree of said second parse tree of the plurality of parse trees.

5. The method of claim 2 wherein said comparing said first parse tree and said second parse tree comprises comparing a particular subtree of said first parse tree of the plurality of parse trees to each subtree of a plurality of subtrees of said second parse tree of the plurality of parse trees.

6. The method of claim 1 wherein said generating said plurality of implicit features comprises comparing each parse tree of the plurality of parse trees to each parse tree of the plurality of parse trees.

7. The method of claim 1 wherein said generating said plurality of explicit features consists of a single pass over the plurality of parse trees.

8. The method of claim 1 wherein said generating said plurality of implicit features comprises multiple passes over the plurality of parse trees.

9. The method of claim 1 wherein:
   said detecting by the machine learning model comprises inferencing based on the feature vector;
   the feature vector contains the plurality of implicit features of the plurality of parse trees.

10. The method of claim 1 wherein said generating said plurality of explicit features is not based on leaves of the plurality of parse trees.

11. One or more computer-readable non-transitory media storing instructions that, when executed by one or more processors, cause:
    generating a plurality of parse trees, wherein each parse tree of the plurality of parse trees represents a respective logic statement in a sequence of logic statements;
    generating each explicit feature, of a plurality of explicit features, from a single respective parse tree of the plurality of parse trees;
    generating each implicit feature, of a plurality of implicit features, from more than one respective parse tree of the plurality of parse trees;
    detecting, by a machine learning model, that the sequence of logic statements is anomalous, based on:
    a) a feature vector that contains the plurality of explicit features of the plurality of parse trees, and
    b) the plurality of implicit features of the plurality of parse trees; and in response to said detecting that the sequence of logic statements is anomalous, retraining, based on a training corpus that contains the sequence of logic statements, the machine learning model.

12. The one or more computer-readable non-transitory media of claim 11 wherein said generating said implicit feature from said more than one parse tree comprises comparing:
   a first parse tree of the plurality of parse trees, and
   a second parse tree of the plurality of parse trees.

13. The one or more computer-readable non-transitory media of claim 12 wherein said comparing said first parse tree and said second parse tree comprises measuring a first similarity between:
   said first parse tree of the plurality of parse trees, and
   said second parse tree of the plurality of parse trees.

14. The one or more computer-readable non-transitory media of claim 13 wherein said measuring said first similarity between said first parse tree and said second parse tree comprises measuring a second similarity between:
   a first subtree of said first parse tree of the plurality of parse trees, and
   a second subtree of said second parse tree of the plurality of parse trees.

15. The one or more computer-readable non-transitory media of claim 12 wherein said comparing said first parse tree and said second parse tree comprises comparing a particular subtree of said first parse tree of the plurality of parse trees to each subtree of a plurality of subtrees of said second parse tree of the plurality of parse trees.

16. The one or more computer-readable non-transitory media of claim 11 wherein said generating said plurality of implicit features comprises comparing each parse tree of the plurality of parse trees to each parse tree of the plurality of parse trees.

17. The one or more computer-readable non-transitory media of claim 11 wherein said generating said plurality of explicit features consists of a single pass over the plurality of parse trees.

18. The one or more computer-readable non-transitory media of claim 11 wherein said generating said plurality of implicit features comprises multiple passes over the plurality of parse trees.

19. The one or more computer-readable non-transitory media of claim 11 wherein:
   said detecting by the machine learning model comprises inferencing based on the feature vector;
   the feature vector contains the plurality of implicit features of the plurality of parse trees.

20. The one or more computer-readable non-transitory media of claim 11 wherein said generating said plurality of explicit features is not based on leaves of the plurality of parse trees.

21. The method of claim 1 wherein:
   the plurality of parse trees contains at least three parse trees;
   the feature vector contains an explicit feature of each parse tree of the at least three parse trees.

22. The method of claim 1 further comprising in response to said detecting that the sequence of logic statements is anomalous, performing a reaction selected from the group consisting of:
   logging an indication that the sequence of logic statements is anomalous, and rejecting an attempt to execute the sequence of logic statements.

* * * * *

UNITED STATES PATENT AND TRADEMARK OFFICE
CERTIFICATE OF CORRECTION

PATENT NO. : 11,620,118 B2
APPLICATION NO. : 17/175250
DATED : April 4, 2023
INVENTOR(S) : Schneuwly et al.

It is certified that error appears in the above-identified patent and that said Letters Patent is hereby corrected as shown below:

On the Title Page

On page 2, Column 1, item (56) under Other Publications, Line 16, delete "Allandadian" and insert -- Allahdadian --, therefor.

In the Specification

In Column 6, Line 65, delete "$t^1\ t_N$" and insert -- $t_1\ t_N$ --, therefor.

In Column 6, Line 65, delete "$t^1$" and insert -- $t_1$ --, therefor.

Signed and Sealed this
Sixth Day of February, 2024

Katherine Kelly Vidal
*Director of the United States Patent and Trademark Office*